United States Patent [19]

Desilets et al.

[11] Patent Number: 5,420,268
[45] Date of Patent: May 30, 1995

[54] OXYTITANIUM PHTHALOCYANINE IMAGING MEMBERS AND PROCESSES THEREOF

[75] Inventors: Denis Desilets, Mississauga, Canada; Terry L. Bluhm, Pittsford, N.Y.; Cheng-Kuo Hsiao, Mississauga, Canada

[73] Assignee: Xerox Corporation, Stamford, Conn.

[21] Appl. No.: 67,890

[22] Filed: May 27, 1993

[51] Int. Cl.⁶ ............................................. C09B 67/50
[52] U.S. Cl. ..................................... 540/141; 540/143
[58] Field of Search ................................ 540/141, 143

[56] References Cited

U.S. PATENT DOCUMENTS

| | | | |
|---|---|---|---|
| 4,664,997 | 5/1987 | Suzuki et al. | 430/58 |
| 4,728,592 | 3/1988 | Ohaku et al. | 430/59 |
| 4,898,799 | 2/1990 | Fujimaki et al. | 430/59 |
| 4,944,339 | 2/1991 | Kinoshita et al. | 430/78 |
| 4,994,566 | 2/1991 | Mimura et al. | 540/141 |
| 5,008,173 | 4/1991 | Mimura et al. | 430/78 |
| 5,164,493 | 11/1992 | Mayo et al. | 540/143 |
| 5,166,339 | 11/1992 | Duff et al. | 540/141 |
| 5,182,382 | 1/1993 | Mayo et al. | 540/141 |
| 5,183,886 | 2/1993 | Takagishi | 540/141 |
| 5,189,155 | 2/1993 | Mayo et al. | 540/141 |
| 5,189,156 | 2/1993 | Mayo et al. | 540/141 |
| 5,206,359 | 4/1993 | Mayo et al. | 540/143 |
| 5,288,574 | 2/1994 | Desilet et al. | 430/58 |

FOREIGN PATENT DOCUMENTS 0314100 of 0000 European Pat. Off. .
2183262 9/1989 Japan .

*Primary Examiner*—Mukund J. Shah
*Assistant Examiner*—Pavanaram K. Sripada
*Attorney, Agent, or Firm*—E. O. Palazzo

[57] ABSTRACT

A layered photoconductive imaging member comprised of a supporting substrate, a photogenerating layer and a charge transport layer, and wherein the photogenerating layer contains Type IV oxytitanium phthalocyanine obtained by a process which comprises the hydrolysis of a dihalotitanium phthalocyanine in a strong acid.

23 Claims, No Drawings

OXYTITANIUM PHTHALOCYANINE IMAGING MEMBERS AND PROCESSES THEREOF

BACKGROUND OF THE INVENTION

This invention is generally directed to oxytitanium phthalocyanines and processes for the preparation thereof, and more specifically, the present invention is directed to direct, economical processes for obtaining the Type IV polymorph of oxytitanium phthalocyanine and layered photoconductive members comprised of the aforementioned Type IV polymorph of oxytitanium phthalocyanine. In embodiments, the process of the present invention relates to the preparation of titanyl phthalocyanines from a dihalotitanium phthalocyanine, especially the dichloro ($TiCl_2$ phthalocyanine), which is subsequently hydrolyzed to oxytitanium phthalocyanine by dissolution in sulfuric acid. More specifically, in embodiments the process of the present invention comprises the preparation of dichlorotitanium phthalocyanine from phthalonitrile as illustrated, for example, in U.S. Pat. No. 5,288,574 and U.S. Pat. No. 5,334,478, the disclosures of which are totally incorporated herein by reference; hydrolyzing the aforementioned chloride by dissolving it in a strong acid like sulfuric acid, and thereafter adding the sulfuric acid solution to a mixture of an aliphatic alcohol like methanol, and water followed by washing with, for example, water and dilute ammonium hydroxide. Advantages associated with the processes of the present invention include the preparation of Type IV oxytitanium phthalocyanine in one reaction step, and wherein the dichlorotitanium phthalocyanine starting reactant can be obtained from the economical phthalonitrile and wherein the isolation of polymorphic forms of oxytitanium phthalocyanine as accomplished in the prior art can be avoided. Layered imaging members containing the Type IV oxytitanium phthalocyanine obtained by the processes of the present invention possess a number of advantages, such as high photoconductivity, low dark decay and excellent stability in xerographic cycling, for example from about 1 percent to about 20 percent cycle down after 100,000 imaging cycles. The layered photoconductor imaging members of the present invention can be selected for a number of different known imaging and printing processes including, for example, electrophotographic imaging processes, especially xerographic imaging and printing processes wherein negatively charged or positively charged images are rendered visible with toner compositions of the appropriate charge. Generally, the imaging members are sensitive in the wavelength regions of from about 700 to about 850 nanometers, thus diode lasers can be selected as the light source.

Disclosed in U.S. Pat. No. 5,334,478 is a process which comprises the preparation of the Type IV oxytitanium phthalocyanine by the addition of an oxytitanium phthalocyanine containing from 0 to about 95 percent of Type I, and from 100 to about 5 percent of oxytitanium phthalocyanine Type II to a solvent mixture of trifluoroacetic acid and methylene chloride to form a solution thereof; and, thereafter, precipitating the Type X polymorph of oxytitanium phthalocyanine by, for example, adding with stirring the aforementioned trifluoroacetic acid, methylene chloride solution to a mixture of methanol and water, separating the product therefrom by, for example, filtration, and slurrying the product Type X. oxytitanium phthalocyanine obtained with a halobenzene like chlorobenzene to obtain Type IV oxytitanium phthalocyanine. The oxytitanium phthalocyanine Type IV obtained can be selected as an organic photogenerator pigment for use in photoresponsive imaging members containing charge, especially hole transport, layers comprised of aryl amine hole transport molecules. The aforementioned photoresponsive imaging members can be negatively charged when the photogenerating layer is situated between the hole transport layer and the substrate, or positively charged when the hole transport layer is situated between the photogenerating layer and the supporting substrate.

In U.S. Pat. No. 5,288,574, here is illustrated a layered photoconductive imaging member comprised of a supporting substrate, a photogenerating layer comprised of titanyl phthalocyanine photogenerating pigments, and thereover a charge transport layer, and wherein said photogenerating pigments are prepared by a process which comprises the formation of a slurry comprised of dihalotitanium phthalocyanine in a mixture comprised of a trihaloacetic acid and an alkylene chloride; adding the resultant slurry to a mixture of an aliphatic alcohol and water enabling hydrolysis whereby Type X oxytitanium phthalocyanine is obtained; separating the Type X oxytitanium phthalocyanine from the slurry; and, thereafter, subjecting the Type X oxytitanium phthalocyanine obtained to treatment with a halobenzene, followed by the separation of Type IV oxytitanium phthalocyanine photogenerating pigments; and a process for the preparation of Type IV oxytitanium phthalocyanine which comprises the formation of a slurry comprised of dihalotitanium phthalocyanine in a mixture comprised of a trihaloacetic acid and an alkylene chloride; adding the resultant slurry to a mixture comprised of an aliphatic alcohol and water enabling hydrolysis to obtain Type X oxytitanium phthalocyanine; separating the Type X oxytitanium phthalocyanine from the slurry; and thereafter subjecting the Type X oxytitanium phthalocyanine obtained to treatment with a halobenzene, followed by the separation of Type IV oxytitanium phthalocyanine.

Processes for the preparation of oxytitanium phthalocyanines are known, such as the sulfuric acid pasting methods, reference for example EPO publication 314,100. In the aforementioned Mita EPO Patent Publication 314,100, there is illustrated the synthesis of oxytitanium phthalocyanine, see for example pages 5 and 6, by, for example, the reaction of titanium alkoxides and diiminoisoindoline in quinoline or an alkylbenzene, and the subsequent conversion thereof to a mixture containing an alpha type titanyl phthalocyanine pigment by a sulfuric acid pasting process, whereby the synthesized pigment is dissolved in concentrated sulfuric acid, and the resultant solution is poured onto ice to precipitate the alpha mixture form, which is filtered and washed with methylene chloride. This pigment, which was blended with varying amounts of metal free phthalocyanine, can be selected as the electric charge generating layer in layered photoresponsive imaging members.

In Japanese 62-256865 there is disclosed, for example, a process for the preparation of pure Type I oxytitanium phthalocyanine involving the addition of titanium tetrachloride to a solution of phthalonitrile in an organic solvent which has been heated in advance to a temperature of from 160° to 300° C. In Japanese 62-256866, there is illustrated, for example, a method of preparing a titanyl phthalocyanine which involves the rapid heating of a mixture of phthalonitrile and titanium tetrachloride in an organic solvent at a temperature of from 100° to 170° C. over a time period which does not exceed one hour. In Japanese 62-256867, there is described, for example, a process for the preparation of pure Type II oxytitanium phthalocyanine, which involves a similar method except that the time to heat the mixture at from 100° to 170° C. is maintained for at least two and one half hours. Types I and II, in the pure form obtained by the processes of the above publications, apparently afforded layered photoresponsive imaging members with excellent electrophotographic characteristics. Also, as mentioned in the textbook *Phthalocyanine Compounds* by Moser and Thomas, the disclosure of which is totally incorporated herein by reference, polymorphism or the ability to form distinct solid state forms is well known in phthalocyanines. For example, metal-free phthalocyanine is known to exist in at least 5 forms designated as alpha, beta, pi, X and tau. Copper phthalocyanine crystal forms known as alpha, beta, gamma, delta, epsilon and pi are also known. These different polymorphic forms are usually distinguishable on the basis of differences in the solid state properties of the materials which can be determined by measurements, such as differential scanning calorimetry, infrared spectroscopy, ultraviolet-visible-near infrared spectroscopy and, especially, X-ray powder diffraction (XRPD) techniques. There appears to be general agreement on the nomenclature used to designate specific polymorphs of commonly used pigments such as metal-free and copper phthalocyanine. However, this does not appear to be the situation with oxytitanium phthalocyanines as different nomenclature is selected in a number of instances. For example, reference is made to alpha, beta, A, B, C, y, and m forms of oxytitanium phthalocyanine with different names being used for the same form in some situations. It is believed that at least five distinct crystal forms of oxytitanium phthalocyanines are known, that is Types X, I, II, III and IV.

In Sanyo-Shikiso Japanese 63-20365/86, reference is made to the known crystal forms alpha and beta oxytitanium phthalocyanines (Types II and I, respectively, it is believed), which publication also describes a process for the preparation of a new form of oxytitanium phthalocyanine. This publication appears to suggest the use of the unnamed oxytitanium phthalocyanine as a pigment and its use as a recording medium for optical discs. This apparently new form was prepared by treating acid pasted oxytitanium phthalocyanine (Type II form, it is believed) with a mixture of chlorobenzene and water at about 50° C. The resulting apparently new form is distinguished on the basis of its XRPD.

In U.S. Pat. No. 4,728,592, there is illustrated, for example, the use of alpha type oxytitanium phthalocyanine in an electrophotographic device having sensitivity over a broad wavelength range of from 500 to 900 nanometers. This form was prepared by the treatment of dichlorotitanium phthalocyanine with concentrated aqueous ammonia and pyridine at reflux for 1 hour. Also described in the aforementioned patent is a beta type oxytitanium phthalocyanine (Type I) pigment, which is believed to provide a much poorer quality photoreceptor.

In Konica Japanese 64-17066/89, there is disclosed, for example, the use of a new crystal modification of oxytitanium phthalocyanine prepared from alpha type pigment (Type II) by milling it in a sand mill with salt and polyethylene glycol. This pigment had a strong XRPD peak at a value of 2 theta of 27.3 degrees. This publication also discloses that this new form differs from alpha type pigment in its light absorption and shows a maximum absorbance at 817 nanometers compared to alpha type, which has a maximum at 830 nanometers. The aforementioned Konica publication also discloses the use of this new form of oxytitanium phthalocyanine in a layered electrophotographic device having high sensitivity to near infrared light of 780 nanometers. The new form is indicated to be superior in this application to alpha type oxytitanium phthalocyanine. Further, this new form is also described in U.S. Pat. No. 4,898,799 and in a paper presented at the Annual Conference of Japan Hardcopy in July 1989. In this paper, this same new form is referred to as Type Y, and reference is also made to Types I, II, and III as A, B, and C, respectively.

Processes for the preparation of specific polymorphs of oxytitanium phthalocyanine, which require the use of a strong acid such as sulfuric acid, are known, and these processes, it is believed, are not easily scalable for manufacturing purposes and generally lead to some decomposition of the organic pigment. One process as illustrated in Konica Japanese Laid Open on Jan. 20, 1989 as 64-17066 (U.S. Pat. No. 4,643,770 appears to be its equivalent), the disclosure of which is totally incorporated herein by reference, involves, for example, the reaction of titanium tetrachloride and phthalonitrile in a 1-chloronaphthalene solvent to produce dichlorotitanium phthalocyanine which is then subjected to hydrolysis by ammonia water to enable the formation of the Type II polymorph. This phthalocyanine is preferably treated with an electron releasing solvent such as 2-ethoxyethanol, dioxane, or N-methylpyrrolidone, followed by subjecting the alpha oxytitanium phthalocyanine to milling at a temperature of from 50° to 180° C. In a second method described in the aforementioned Japanese Publication, there is disclosed the preparation of alpha type oxytitanium phthalocyanine with sulfuric acid. This method for the preparation of Type IV oxytitanium phthalocyanine involves the addition of an aromatic hydrocarbon, such as chlorobenzene solvent, to an aqueous suspension of Type II oxytitanium phthalocyanine prepared by the well known acid pasting process, and heating the resultant suspension to about 50° C. as disclosed in Sanyo-Shikiso Japanese 63-20365, Laid Open on Jan. 28, 1988. In Japanese 171771/1986, Laid Open Aug. 2, 1986, there is disclosed the purification of metal phthalocyanines by treatment with N-methylpyrrolidone.

To obtain an oxytitanium phthalocyanine based photoreceptor having high sensitivity to near infrared light and especially to provide a photoreceptor which can be repeatedly cycled in the xerographic process, it is believed necessary to control not only the purity and chemical structure of the pigment, as is generally the situation with organic photoconductors, but also to prepare the pigment in the correct crystal form. The disclosed processes used to prepare specific crystal forms of oxytitanium phthalocyanine, such as Types I, II, III and IV, are either complicated and difficult to control as in the preparation of pure Types I and II pigment by careful control of the synthesis parameters by the processes described in Mitsubishi Japanese 62-25685, -6 and -7, or involve harsh treatment, such as sand milling at high temperature, reference Konica U.S.

Pat. No. 4,898,799; or dissolution of the pigment in a large volume of concentrated sulfuric acid, a solvent which is known to cause decomposition of metal phthalocyanines by sulfonation or demetallization, reference Sanyo-Shikiso Japanese 63-20365 and Mita EPO 314,100.

Generally, layered photoresponsive imaging members are described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, oxymetallo phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

In copending application U.S. Ser. No. 537,714 (D/90087), the disclosure of which is totally incorporated herein by reference, there are illustrated photoresponsive imaging members with photogenerating oxytitanium phthalocyanine layers prepared by vacuum deposition. It is indicated in this copending application that the imaging members comprised of the vacuum deposited oxytitanium phthalocyanines and aryl amine hole transporting compounds exhibit superior xerographic performance, since low dark decay characteristics result and higher photosensitivity is observed, particularly in comparison to several prior art imaging members prepared by solution coating or spray coating, reference, for example, U.S. Pat. No. 4,429,029.

In U.S. Pat. No. 5,153,313, the disclosure of which is totally incorporated herein by reference, there is illustrated a process for the preparation of phthalocyanine composites which comprises adding a metal free phthalocyanine, a metal phthalocyanine, an oxymetallo phthalocyanine or mixtures thereof to a solution of trifluoroacetic acid and a monohaloalkane; adding to the resulting mixture an oxytitanium phthalocyanine; adding the resulting solution to a mixture that will enable precipitation of said composite; and recovering the phthalocyanine composite precipitated product.

In U.S. Pat. No. 5,206,359, the disclosure of which is totally incorporated herein by reference, there is illustrated a process for the preparation of oxytitanium phthalocyanine which comprises the treatment of Type X oxytitanium phthalocyanine with a halobenzene; and more specifically, in one embodiment of this patent there are illustrated processes for the preparation of Type X oxytitanium phthalocyanine which comprises the solubilization of a Type I oxytitanium phthalocyanine, which can be obtained by the reaction of 1,3-diiminoisoindoline and titanium tetrabutoxide in the presence of a solvent, such as chloronaphthalene, reference U.S. Pat. No. 5,189,156, the disclosure of which is totally incorporated herein by reference, in a mixture of trifluoroacetic acid and methylene chloride, precipitation of the desired Type X oxytitanium phthalocyanine, separation by, for example, filtration, and thereafter subjecting the product to washing with fluorobenzene; more specifically, U.S. Pat. No. 5,189,156 discloses a process for the preparation of oxytitanium phthalocyanine which comprises the reaction of a titanium tetraalkoxide and 1,3-diiminoisoindoline in the presence of a halonaphthalene solvent; dissolving the resulting Type I oxytitanium phthalocyanine in a haloacetic acid and an alkylene halide; adding the resulting mixture slowly to a cold alcohol solution; and thereafter isolating the resulting Type X oxytitanium phthalocyanine with an average volume particle size diameter of from about 0.02 to about 0.5 micron; U.S. Pat. No. 5,189,155 discloses a process for the preparation of Type I oxytitanium phthalocyanine which comprises the reaction of titanium tetraalkoxide and 1,3-diiminoisoindoline in the presence of a halonaphthalene solvent; U.S. Pat. No. 5,166,339 discloses a process for the preparation of titanyl phthalocyanine which comprises dissolving a titanyl phthalocyanine in a solution of trifluoroacetic acid and methylene chloride; adding the resultant solution to a solvent system that will enable precipitation; and separating the desired titanyl phthalocyanine from the solution followed by an optional washing; U.S. Pat. No. 5,182,382 discloses a process for the preparation of titanyl phthalocyanine Type X which comprises dissolving titanyl phthalocyanine Type I in a solution of trifluoroacetic acid and methylene chloride; adding the resultant solution to a solvent enabling precipitation of Type X titanyl phthalocyanine; separating the titanyl phthalocyanine Type X from the solution; followed by a first washing with an organic solvent and a second washing with water; and thereafter a solvent treatment with fluorobenzene; and U.S. Pat. No. 5,164,493 discloses a process for the preparation of titanyl phthalocyanine which comprises the reaction in a solvent of phthalonitrile and diiminoisoindoline with titanium tetraalkoxide.

The disclosures of each of the aforementioned patents are totally incorporated herein by reference.

SUMMARY OF THE INVENTION

It is an object of the present invention to provide imaging members and processes for the preparation of oxytitanium phthalocyanines with many of the advantages illustrated herein.

Another object of the present invention is to provide a direct and economical process for the preparation of the highly photosensitive Type IV oxytitanium phthalocyanine.

It is yet another object of the present invention to provide economically scalable processes for the preparation of Type IV oxytitanium phthalocyanine by the hydrolysis of dichlorotitanium phthalocyanine in a strong acid at a low temperature of, for example, from about zero to about 5° C., and subsequently precipitating the Type IV oxytitanium phthalocyanine by adding the resulting solution to a mixture of water and an alcohol like methanol.

Another object of the present invention relates to the direct preparation of a stable, highly photosensitive Type IV oxytitanium phthalocyanine from dichlorotitanium phthalocyanine.

Another object of the present invention is to provide a process for the preparation of the Type IV oxytitanium phthalocyanine which does not require the use of any other polymorphs or mixture of polymorphs of oxytitanium phthalocyanine.

Moreover, another object of the present invention relates to the preparation of stable, highly photosensitive Type IV oxytitanium phthalocyanine of high purity, for example exceeding about 99 percent, and the use thereof in electrophotographic imaging processes.

Another object of the present invention in an embodiment thereof resides in the preparation of the Type IV polymorph of oxytitanium phthalocyanine having a small particle size of about 0.05 to about 0.2 micron, which is advantageous for the preparation of electrophotographic devices since, for example, the prepared polymorph can be easily dispersed in coating compositions.

Further, in another object of the present invention there are provided processes for the preparation of Type IV oxytitanium phthalocyanine that has excellent photosensitivity in the 600 to 850 nanometer range when utilized in layered imaging members.

A further object of the present invention resides in the provision of highly sensitive, stable photoresponsive imaging members with an aryl amine hole transport layer, and a photogenerator layer comprised of Type IV oxytitanium phthalocyanine pigment obtained by the processes illustrated herein.

Also, in a further object of the present invention there are provided direct economical processes for the preparation of certain titanyl phthalocyanines wherein dichlorotitanium phthalocyanine is dissolved and hydrolyzed in sulfuric acid to form oxytitanium phthalocyanine; no polymorph at this stage because it is dissolved; the resulting solution is then poured into a solvent mixture of an aliphatic alcohol, like methanol, and water, and Type IV oxytitanium phthalocyanine is obtained. Advantages of such processes include the preparation of a titanyl phthalocyanine Type IV pigment by a route which involves at most two steps: 1) preparation of dichlorotitanium phthalocyanine from phthalonitrile, and 2) direct preparation of Type IV oxytitanium phthalocyanine by hydrolysis in a strong acid like sulfuric acid, followed by precipitation in methanol/water; no other polymorphs of oxytitanium phthalocyanine need to be isolated in the process; and the pigment is dissolved during the hydrolysis which allows for the removal of impurities, for a more homogeneous composition of the pigment and for a process which is more reproducible.

In embodiments, the present invention relates to processes for the preparation of oxytitanium phthalocyanine and photoresponsive imaging members thereof. More specifically, in embodiments of the present invention there are provided processes for the preparation of the Type IV polymorph of oxytitanium phthalocyanine, which comprises hydrolyzing a dihalotitanium phthalocyanine in a strong acid; adding the solution formed to a precipitation mixture comprised of water and an alcohol, like an aliphatic alcohol with, for example, 1 to about 12, and preferably 1 carbon atom to 6 carbon atoms, such as methanol, ethanol, and the like, and more preferably methanol; isolating the Type IV oxytitanium phthalocyanine obtained; thereafter washing the pigment (Type IV); optionally washing the pigment with a mixture of water and a halobenzene; and separating the Type IV obtained. The products can be identified by various known means including X-ray powder diffraction (XRPD).

One embodiment of the present invention is directed to processes for the preparation of Type IV oxytitanium phthalocyanine, as determined by X-ray powder diffraction, which comprises providing a dichlorotitanium phthalocyanine, or obtaining dichlorotitanium phthalocyanine from phthalonitrile; dissolving and hydrolyzing the dichlorotitanium phthalocyanine in a strong acid like sulfuric acid at low temperatures, for example from about zero to about 10, and preferably 2° C.; precipitation of oxytitanium phthalocyanine Type IV from a mixture of water and an aliphatic alcohol like methanol and washing with, for example, water and a hydroxide like a dilute solution of ammonium hydroxide; and isolating the Type IV by, for example, filtration or centrifugation.

In embodiments, the process of the present invention comprises adding 1 part by weight of the dichlorotitanium phthalocyanine to 45 parts concentrated sulfuric acid while retaining the internal temperature thereof to between from about 2° to about 5° C. The mixture can then be stirred for 3 hours at from about 0° to about $-2°$ C. and then added dropwise to a vigorously stirred mixture of 364 parts of water and 364 parts of methanol, and the internal temperature was retained at below 5° C. The suspension was filtered on a Whatman GF/A glass fiber filter and the solid was slurried in 91 parts of 2.5 percent (v/v) ammonium hydroxide for 60 minutes, filtered, slurried 5 times in 91 parts water and filtered. The Type IV polymorph of oxytitanium phthalocyanine obtained was then slurried in 35 parts water, heated to 50° C. and 1.6 parts of chlorobenzene were added dropwise. After 1 hour of stirring at 50° C., the solvent was decanted and the oxytitanium phthalocyanine Type IV pigment was slurried in 23 parts methanol for 30 minutes and filtered to yield Type IV oxytitanium phthalocyanine after drying under high vacuum. The product was identified by XRPD and IR.

A typical small scale conversion reaction was accomplished in an embodiment of the present invention as follows:

2.75 Grams of dichlorotitanium phthalocyanine were added to 125 grams sulfuric acid with stirring while retaining the internal temperature below 5° C. Stirring was continued for 3 hours, retaining the temperature at from about 0° to 2° C. and the resultant dark green solution was then added dropwise into 1 kilogram of a vigorously stirred 1:1 (w/w) mixture of methanol and water, while maintaining the internal temperature at 5° C. The resultant dark blue suspension was then filtered through a glass fiber filter (Whatman GF/A grade). The resultant wet filter cake was transferred to a 500 milliliter flask and slurried in 250 milliliters of 2.5 percent (v/v) ammonium hydroxide for 60 minutes, filtered, slurried 5 times in 250 milliliters of water, and again filtered. The resulting Type IV oxytitanium phthalocyanine, identified by its XRPD trace, was then slurried in 88 milliliters water, heated to 50° C., and 3.75 milliliters of chlorobenzene were added dropwise. After 1 hour of stirring at 50° C., the solvent was decanted and the pigment was slurried in 80 milliliters of methanol for 30 minutes. 2.09 Grams of dark blue pigment were obtained after drying under high vacuum. The product was identified as Type IV oxytitanium phthalocyanine on the basis of its XRPD trace.

Numerous different layered photoresponsive imaging members with the phthalocyanine pigments obtained by the processes of the present invention can be fabricated. In embodiments, the layered photoresponsive imaging members can be comprised of a supporting substrate, a charge transport layer, especially an aryl amine hole transport layer, and situated therebetween a photogenerator layer comprised of the oxytitanium phthalocyanine Type IV. Another embodiment of the present invention is directed to positively charged layered photoresponsive imaging members comprised of a supporting substrate, a charge transport layer, especially an aryl amine hole transport layer, and as a top overcoating, the Type IV oxytitanium phthalocyanine pigment obtained with the processes of the present invention. Moreover, there is provided in accordance with the present invention an improved negatively charged photoresponsive imaging member comprised of a supporting substrate, a thin adhesive layer, a Type IV oxytitanium phthalocyanine photogenerator obtained by the processes of the present invention dispersed in a polymeric resinous binder, and as a top layer, aryl amine hole transporting molecules dispersed in a polymeric resinous binder.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and charge transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished in such a manner that the final coating thickness is from 0.01 to about 30 microns after it has dried. The fabrication conditions for a given layer can be tailored to achieve optimum performance and cost in the final device.

Imaging members with the oxytitanium phthalocyanine pigment of the present invention are useful in various electrostatographic imaging and printing systems, particularly those conventionally known as xerographic processes. Specifically, the imaging members of the present invention are useful in xerographic imaging processes wherein the oxytitanium phthalocyanine pigment absorbs light of a wavelength of from about 600 nanometers to about 900 nanometers. In these known processes, electrostatic latent images are initially formed on the imaging member followed by development, and thereafter, transferring the image to a suitable substrate.

Moreover, the imaging members of the present invention can be selected for electronic printing processes with gallium arsenide light emitting diode (LED) arrays which typically function at wavelengths of from 660 to about 830 nanometers.

The negatively charged photoresponsive imaging member of the present invention can be comprised of a supporting conducting substrate coated with a charge blocking layer comprised, for example, of a silane layer or a mixed silane/zirconium oxide layer, an optional solution coated adhesive layer comprised, for example, of a polyester 49,000 available from Goodyear Chemical, a photogenerator layer comprised of a Type IV oxytitanium phthalocyanine obtained by the process of the present invention optionally dispersed in an inactive resinous binder, and a charge transport layer comprised of N,N'-diphenyl-N,N'-bis(3-methylphenyl)-1,1'-biphenyl-4,4'-diamine dispersed in a MAKROLON ® polycarbonate resinous binder. This member has the following electrical characteristics: $E_{\frac{1}{2}}$ equal to 1.4 erg/cm$^2$ at 780 nanometers, a dark decay of 11 volts/second, and a percent discharge at 5 and 10 ergs/cm$^2$ of 72 and 76 percent.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness. In embodiments, the thickness of this layer is from about 75 microns to about 300microns.

With further regard to the imaging members, the photogenerator layer is comprised of the Type IV oxytitanium phthalocyanine pigment obtained by the processes of the present invention dispersed in resinous binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the oxytitanium phthalocyanine photogenerator composition is present in an amount of from about 5 percent to about 100 percent by volume. In embodiments, this layer is of a thickness of from about 0.1 micron to about 1 micron when the photogenerator composition is present in this layer in an amount of 30 to 75 percent by volume. The maximum thickness of this layer in embodiments is dependent primarily upon factors, such as photosensitivity, electrical properties and mechanical considerations. The charge generator layer can be obtained by dispersion coating the oxytitanium phthalocyanine obtained by the processes of the present invention, and a binder resin with a suitable solvent. The binder may be omitted. The dispersion can be prepared by mixing and/or milling the oxytitanium phthalocyanine in known equipment such as paint shakers, ball mills, sand mills and attritors. Common grinding media such as glass beads, steel balls or ceramic beads may be used in this equipment. A binder resin may be selected from a number of polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. The solvents to dissolve these binders depend upon the particular resin. In embodiments of the present invention, it is desirable to select solvents that do not effect the other coated layers of the device. Examples of solvents useful for coating oxytitanium phthalocyanine dispersions to form a photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the oxytitanium phthalocyanine dispersion in embodiments of the present invention can be accomplished with spray, dip or wire bar methods such that the final dry thickness of the charge generator layer is from 0.01 to 30 microns and preferably from 0.1 to 15 microns after being dried at 40° to 150° C. for 5 to 90 minutes.

Also, illustrative examples of polymeric binder resinous materials that can be selected for the photogenerator pigment include those polymers as disclosed in U.S. Pat. No. 3,121,006, the disclosure of which is totally incorporated herein by reference.

As a blocking layer, there can be selected various known silanes or silane/zirconium oxide mixtures, polyamides or polyurethanes. This layer is of a thickness of from about 0.01 micron to 10 microns, and preferably from 0.02 micron to 0.20 micron.

As optional adhesives, there can be selected various known substances inclusive of polyesters, polyamides, poly(vinyl butyral), poly(vinyl alcohol), polyurethane and polyacrylonitrile. This layer is of a thickness of from about 0.05 micron to 1 micron. Optionally, this layer may contain conductive and nonconductive particles such as zinc oxide, titanium dioxide, silicon nitride, carbon black, and the like to provide, for example, in embodiments of the present invention desirable electrical and optical properties.

Aryl amines selected for the charge transporting layer which is generally of a thickness of from about 5 microns to about 75 microns, and preferably of a thickness of from about 10 microns to about 40 microns, include components of the following formula

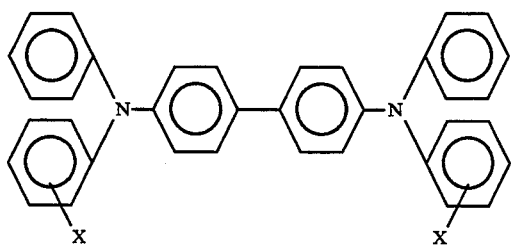

dispersed in a highly insulating and transparent organic resinous binder wherein X is an alkyl group or a halogen, especially those substituents selected from the group consisting of (ortho) CH$_3$, (para) CH$_3$, (ortho) Cl, (meta) Cl, and (para) Cl.

Examples of specific aryl amines are N,N'-diphenyl-N,N'-bis(alkylphenyl)-1,1-biphenyl -4,4'-diamine wherein alkyl is selected from the group consisting of methyl, such as 2-methyl, 3-methyl and 4-methyl, ethyl, propyl, butyl, hexyl, and the like. With chloro substitution, the amine is N,N'-diphenyl-N,N'-bis(halophenyl)-1,1'-biphenyl-4,4'-diamine wherein halo is 2-chloro, 3-chloro or 4-chloro. Other known charge transporting compounds can be selected in embodiments of the present invention.

Examples of the highly insulating and transparent resinous material or inactive binder resinous material for the transport layers include materials such as those described in U.S. Pat. No. 3, 121,006, the disclosure of which is totally incorporated herein by reference. Specific examples of organic resinous materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The invention will now be described in detail with reference to specific preferred embodiments thereof, it being understood that these Examples are intended to be illustrative only. The invention is not intended to be limited to the materials, conditions, or process parameters recited herein, it being noted that all parts and percentages are by weight unless otherwise indicated. The oxytitanium phthalocyanines obtained were identified primarily from their XRPD patterns.

EXAMPLE I

Synthesis of Dichlorotitanium Phthalocyanine:

Dichlorotitanium phthalocyanine can be prepared by following the process described in *Inorganic Chemistry*, Volume 4, pages 111 and 112 (1965) or using the process described in Example II of U.S. Pat. No. 3,825,422, the disclosures of which are totally incorporated herein by reference. More specifically, the aforementioned phthalocyanines can be prepared as follows.

The dichlorotitanium phthalocyanine was prepared as described in U.S. Pat. No. 3,825,422 (by R. J. Gruber and B. Grushkin, Xerox Corporation), that is "to a 1 liter flask, fitted with a thermometer and set up for distillation is added 12.3 grams of titanium trichloride, 20 grams of o-phthalonitrile and 375 milliliters of alpha-chloronaphthalene. The flask is heated under a blanket of nitrogen while being stirred with a magnetic stirrer. When the temperature is at approximately 170° C., an orange-red liquid begins to distill. The temperature is increased steadily to 255° C. (reflux) and is maintained at 255° C. for one hour. The product is then cooled to room temperature. After filtering, the solid is washed with dry benzene and 375 milliliters portions of anhydrous ether. The solid is then dried under vacuum to provide 20.7 grams of dichlorotitanium phthalocyanine."

EXAMPLE II

Purification of the Dichlorotitanium Phthalocyanine:

6.00 grams of dichlorotitanium phthalocyanine prepared by the process described in Example I were added to 200 milliliters of dry N,N-dimethylformamide. The suspension was stirred for 15 minutes under argon, filtered through a glass fiber filter (Whatman GF/A grade) and the solid was washed 3 times with 30 milliliters of dry N,N-dimethylformamide, then 3 times with 30 milliliters of dry ether. 5.50 Grams of dichlorotitanium phthalocyanine were obtained after drying under a high vacuum.

EXAMPLE III

Synthesis of Type IV Oxytitanium Phthalocyanine:

2.75 Grams of dichlorotitanium phthalocyanine of Example II were added to 125 grams of sulfuric acid with stirring while retaining the internal temperature below 5° C. Stirring was continued for 3 hours, while maintaining the temperature at 0° to 2° C., and the resultant dark green solution was then added dropwise into 1 kilogram of a vigorously stirred, 1:1 (w/w) mixture of methanol and water, keeping the internal temperature at 5° C. The resultant dark blue suspension was filtered through a glass fiber filter (Whatman GF/A grade). The resultant wet filter cake was transferred to a 500 milliliter flask and was slurried in 250 milliliters of 2.5 percent (v/v) ammonium hydroxide for 60 minutes, filtered, slurried 5 times in 250 milliliters of water, and again filtered. The resulting Type IV oxytitanium phthalocyanine, identified by its XRPD trace, was then slurried in 88 milliliters of water, heated to 50° C. and 3.75 milliliters of chlorobenzene were added dropwise. After 1 hour of stirring at 50° C., the solvent of water and chlorobenzene was decanted and the pigment was slurried in 80 milliliters of methanol for 30 minutes. 2.09 Grams of dark blue pigment was obtained after drying under high vacuum. The product was identified as Type IV oxytitanium phthalocyanine on the basis of its XRPD trace.

The resulting Type IV pigment, when selected for use as a photogenerator in a layered imaging member, evidenced a dark decay of 11 volts per second, and an $E_{\frac{1}{2}}$ of 1.4 ergs/cm$^2$ at 780 nanometers. Discharge at 5 and 10 ergs/cm$^2$ was 72 and 76 percent, respectively, at 780 nanometers. The cycle down for this member was 8 percent after 50,000 imaging cycles.

The above Type IV oxytitanium phthalocyanine was evaluated as a photogenerator in xerographic imaging devices which were prepared by the following procedure. An aluminized MYLAR ® substrate (4 mils) was coated with a silane/zirconium oxide solution prepared by mixing 6.5 grams of acetylacetonatetributoxyzirconium, 0.75 gram of (aminopropyl)trimethoxysilane, 28.5 grams of isopropyl alcohol and 14.25 grams of butanol using a number 5 wound wire rod applicator. This layer was dried at 140° C. for 20 minutes; the final thickness was measured to be 0.1 micron. A dispersion of the oxytitanium phthalocyanine was prepared by combining 0.56 gram of the Type IV oxytitanium phthalocyanine and 0.26 gram of poly(vinyl butyral) in 19.7 grams of butyl acetate in a 60 milliliter jar containing 70 grams of 0.8 millimeter glass beads in a paint shaker. The dispersion was shaken for 2 hours, and then was coated onto the silane/zirconium oxide layer described above using a number 6 wound wire rod applicator. The thus formed photogenerating layer was dried at 100° C. for 10 minutes; its final thickness was determined to be about 0.20 micron.

Hole transporting layer solutions were prepared by dissolving 5.4 grams of N,N'-diphenyl-N,N-bis(3-methylphenyl)-1,1'-biphenyl-4,4'diamine and 8.1 grams of polycarbonate (Z) in 61.5 grams of chlorobenzene. The solution was coated onto the oxytitanium phthalocyanine generator layer using a 10 mil film applicator. The charge transporting layer thus obtained was dried at 115° C. for 60 minutes to provide a final thickness of about 27 microns.

The xerographic electrical properties of the photoresponsive imaging members were determined by electrostatically charging the surface thereof with a corona discharge source until the surface potential as measured by a capacitatively coupled probe attached to an electrometer attained an initial dark value, $V_0$, of $-800$ volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100\times(V_{ddp}-V_{bg})/V_{ddp}$. The half-exposure energy, $E_{\frac{1}{2}}$, the required exposure energy causing reduction of the $V_{ddp}$ to half of its initial value, was determined to be 1.4 ergs/cm$^2$. The wavelength of incident light selected was 780 nanometers.

Other modifications of the present invention may occur to those skilled in the art subsequent to a review of the present application. The aforementioned modifications, including equivalents thereof, are intended to be included within the scope of the present invention.

What is claimed is:

1. A process for the preparation of Type IV oxytitanium phthalocyanine consisting essentially of the hydrolysis of a dihalotitanium phthalocyanine in a strong acid; subsequently precipitating the Type IV oxytitanium phthalocyanine by adding the resulting solution to a mixture comprised of an aliphatic alcohol and water; washing the Type IV pigment with aqueous ammonia and water.

2. A process in accordance with claim 1 wherein the dihalotitanium phthalocyanine is dichlorotitanium phthalocyanine.

3. A process in accordance with claim 1 wherein the acid is sulfuric acid.

4. A process in accordance with claim 1 wherein the aliphatic alcohol is methanol.

7. A process in accordance with claim 1 wherein the halobenzene is chlorobenzene.

8. A process in accordance with claim 1 wherein the acid hydrolysis is performed by dissolving 1 part by weight of the dihalotitanium phthalocyanine at about 5° C. in from about 25 parts to about 75 parts by weight of acid and stirring for a period of from about 15 minutes to about 5 hours.

9. A process in accordance with claim 1 wherein the precipitation mixture is comprised of methanol and water in a weight ratio of from about 70 percent of methanol and 30 percent of water to about 30 percent of methanol and 70 percent of water.

10. A process in accordance with claim 1 wherein the precipitation is accomplished at a temperature of from about 0° C. to about 15° C.

11. A process in accordance with claim 5 wherein the halobenzene slurry is accomplished by stirring 1 part by weight of said Type IV in from about 5 parts to about 50 parts of water at a temperature of from about 30° C. to about 100° C., adding from about 1 part to about 20 parts of chlorobenzene, and stirring the mixture from about 30 minutes to about 5 hours.

12. A process in accordance with claim 1 wherein the resulting Type IV oxytitanium phthalocyanine is dried after isolation by slurrying in methanol, followed by filtration, and heating at a temperature of from about 30° C. to about 150° C.

13. A process in accordance with claim 1 wherein the dihalotitanium phthalocyanine is purified by slurrying in N,N-dimethylformamide prior to the hydrolysis.

15. A process for the preparation of Type IV titanyl phthalocyanine which comprises the hydrolysis of a dichlorotitanium phthalocyanine in an acid; subsequently precipitating Type IV titanyl phthalocyanine by mixing the resulting solution with a mixture comprised of an aliphatic alcohol and water; separating the Type IV from said solution; washing said Type IV with aqueous ammonia and water; slurrying the product obtained in a mixture of water and a halobenzene; and wherein said dichlorotitanium phthalocyanine is obtained from phthalonitrile.

16. A process in accordance with claim 12 wherein the halobenzene is chlorobenzene.

17. A process in accordance with claim 12 wherein the precipitation is accomplished at a temperature of from about 0° C. to about 15° C.

18. A process in accordance with claim 12 wherein the precipitation mixture is comprised of methanol and water in a weight ratio of from about 70 percent of methanol and 30 percent of water to about 30 percent of methanol and 70 percent of water.

19. A process for the preparation of Type IV oxytitanium phthalocyanine which comprises the hydrolysis of a dihalotitanium phthalocyanine in a strong acid; subsequently precipitating the Type IV oxytitanium phthalocyanine by adding the resulting solution to a solution mixture comprised of an aliphatic alcohol; washing the Type IV pigment obtained with aqueous basic solution; and mixing the resultant product with water and a halobenzene.

20. A process in accordance with claim 16 wherein the halobenzene is chlorobenzene.

21. A process in accordance with claim 16 wherein the dihalotitanium phthalocyanine is obtained from phthalonitrile, and the strong acid is sulfuric acid.

14. A process in accordance with claim 1 wherein dichlorotitanium phthalocyanine is dissolved and hydrolyzed in sulfuric acid to form oxytitanium phthalocyanine in solution and, thereafter, contacting the solution with a methanol/water mixture to obtain Type IV titanyl phthalocyanine.

5. A process in accordance with claim 1 wherein the Type IV oxytitanium phthalocyanine obtained is washed with aqueous ammonia and water, and subsequently said Type IV is subjected to slurrying in a mixture of water and a halobenzene.

6. A process in accordance with claim 20 wherein the halobenzene is chlorobenzene.

22. A process for the preparation of a Type IV oxytitanium phthalocyanine consisting of the hydrolysis of a dichlorotitanium phthalocyanine in a strong acid, and wherein said dichlorotitanium phthalocyanine is added to sulfuric acid while retaining the internal temperature below about 5° C.; stirring while retaining the temperature at from about 0° to about 2° C.; adding the resulting solution to a mixture of methanol and water while maintaining the internal temperature of the mixture at about 5° C.; filtering the suspension that results and slurrying the wet filter cake obtained with ammonium hydroxide, followed by filtration and slurrying the product in water; and subsequently slurrying the Type IV obtained in water and chlorobenzene.

23. A process in accordance with claim 22 wherein 275 grams of dichlorotitanium phthalocyanine were selected, 125 grams of sulfuric acid were selected, the ratio of methanol and water selected is from about 1:1 on a weight to weight basis, the amount of ammonium hydroxide selected was 250 milliliters, and the Type IV is mixed in chlorobenzene and water at 50° C.

* * * * *